United States Patent Office 3,112,254
Patented Nov. 26, 1963

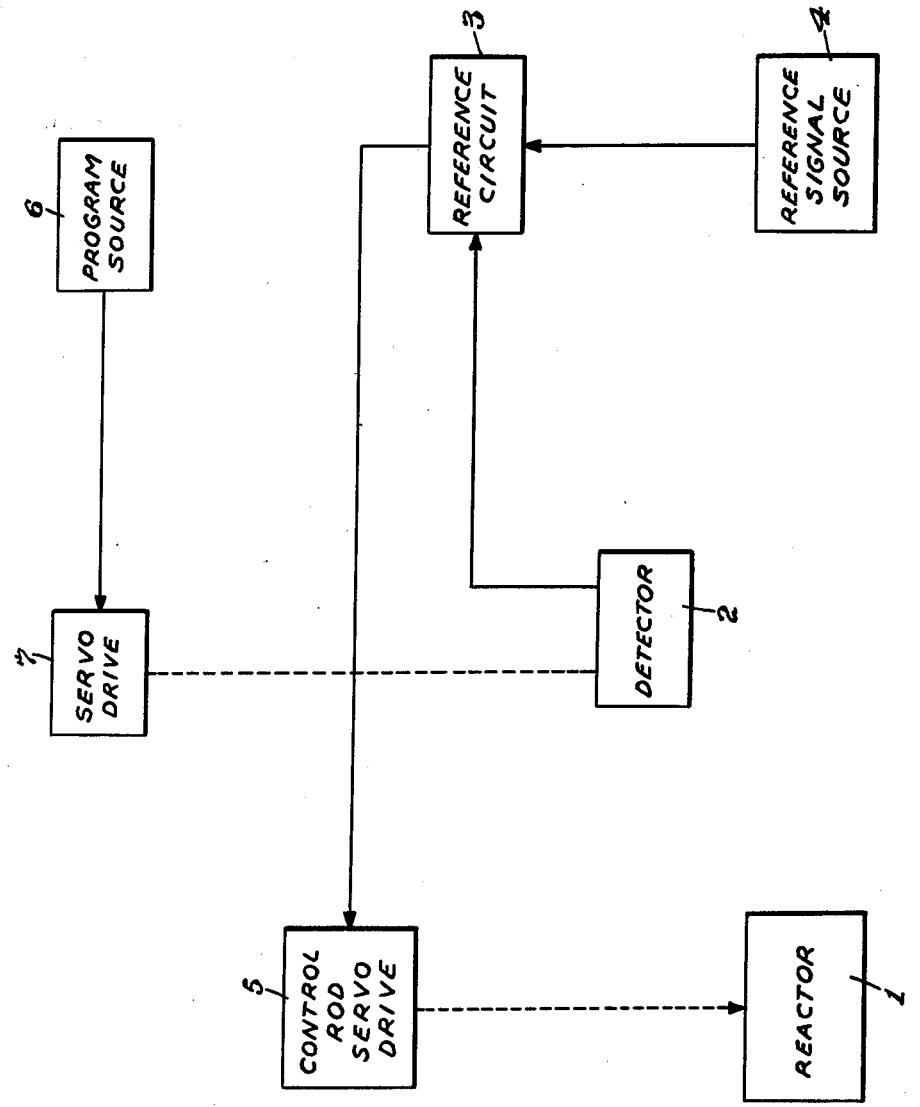

3,112,254
APPARATUS FOR AUTOMATIC REGULATION OF THE PERIOD OF ATOMIC REACTORS
Pavel Kovanic and Milan Kulka, Prague, Czechoslovakia, assignors to Zavody V. I. Lenina Plzen, narodni podnik, Plzen, Czechoslovakia
Filed Feb. 16, 1959, Ser. No. 793,639
Claims priority, application Czechoslovakia Feb. 18, 1958
1 Claim. (Cl. 204—193.2)

The control of the reactor period that is the derivative of the logarithm of the output with respect to time, is of greatest importance in the operation of atomic reactors. In known devices, the reactor period is controlled manually on the basis of measuring the time of the doubling of the reactor output or power level, or on the basis of the indication of an instrument which measures the reactor period; or the reactor period is controlled automatically by means of a control system consisting of a stationary detecting element, a period meter, a reference circuit, a source of the reference signal, amplifiers and a servo-mechanism for actuating the control element or rod of the reactor. The instruments for measuring the period of the reactor are complicated, and in their use of a detecting element fixedly located in the reactor field, the intensity of which varies over a very wide range, they are impaired by the necessity of switching over the inputs of the circuits at several points in the wide range of the reactor output. Verification of the correct or accurate operation of such measuring and controlling devices and the securing of their faultless function, which are important for the safe operation of the reactor, are only difficultly achieved through the use of complicated means.

The above mentioned shortcomings are eliminated by the method of automatic control of the period of atomic reactors according to the invention.

In accordance with the invention, a reactor is controlled in the period range by means of a detecting element which measures the radiation intensity of the reactor. The detecting element is arranged for movement by a servo-drive mechanism controlled by a program source according to a desired control program. The output signal of the detecting element is fed to a reference circuit, including an amplifier, for comparison with a reference signal. The resulting differential signal is further modified and amplified as may be required, and fed to the servo-drive of the control elements of the reactor, such as control rods, to cause movement of the control elements in a direction to cause a decrease in the differential signal. The reactor output thus varies in accordance with the movement of the detector element. When the detector element is moved along a path in which the intensity of radiation varies exponentially with the position of the detecting element, the period of the reactor becomes a function of the velocity of the detecting element along that path.

A preferred embodiment of the invention is schematically represented in the sole FIGURE of the drawing:

Near the active zone 1 of the reactor is the detector in the form of a neutron pulse chamber 2 which is moved by a servomechanism 7 according to the desired program of period control as determined by the program source. The signal from the chamber 2 is, after integration of the pulses and after amplification, subtracted in the reference circuit 3 from a reference signal of a source 4. The resulting differential or control signal from the reference circuit 3 is, after further amplification, led into the servo-mechanism 5 for actuating the control rod of the reactor in such a manner that the output of the reactor is changed to make the differential or control signal assume the least possible value. In accordance with the invention, the distribution of the neutron flux for radiation intensity in the radiation field of the reactor along the path of movement of the detecting element is approximately an exponential function of the spatial coordinate, that is, at any instant, the intensity of radiation decreases approximately exponentially along the path of movement of detector 2 with increasing distance from the radiation source. If the detecting element moves away from the radiation source at a constant velocity, its signal diminishes exponentially with time for a constant output of the reactor, providing the coupling from the reference circuit 3 to the servomechanism 5 has been interrupted. This means that if the reactor output increases exponentially as a function of time at a rate corresponding to a constant speed of movement of the detector 2, even with a closed coupling between the reference circuit 3 and the servomechanism 5, the latter will not be further operated if it already has imparted the corresponding period to the reactor output, so that the influence of the spatial diminution and the influence of the growth of the output with time are mutually compensated. If the growth of the reactor output with time does not correspond to the velocity at which the neutron chamber moves, the control system suitably corrects the position of the control rod of the reactor. This means that the system imparts to the reactor the period determined by the velocity of movement of the detecting element.

The advantages of the method according to the invention are as follows: The reactor period is automatically controlled according to the required program, without providing an instrument for measuring the period, whereby the system is considerably simplified, its reliability is increased and an easy verification of the accuracy of its operation is made possible. The operation of the system requires no switching over as the power level of the reactor passes through successive portions of its wide range, for, in the present invention, the detecting element permanently is subjected to approximately constant conditions, independently of the output of the reactor. In case of a stoppage of the movement of the detecting element 2 for any reasons, the system becomes a power level control system which automatically maintains the reactor at the output determined by the position in which the detecting element has come to rest. This means that the system according to the invention for controlling the period of the reactor can also perform other functions.

We claim:
Apparatus for automatically controlling the reactor period of a reactor having a control rod which is movable to vary the output of the reactor; comprising a detector disposed in the radiation field of the reactor and movable relative to the latter along a path which is directed to provide radiation intensities along said path which decrease approximately exponentially with increasing distance from the reactor, said detector generating an out- put signal responsive to the intensity of said radiation servomechanism for moving said detector along said path, means operating said servomechanism to effect movement of said detector at a predetermined constant speed along said path, a source of a constant reference signal, reference circuit means subtracting the output signal of said detector from said reference signal and producing a differential control signal corresponding to the difference between said output and reference signals, and a servomechanism for moving the control rod of the reactor in response to said control signal so as to reduce the magnitude of said control signal, whereby the reactor period is made to correspond to said speed of movement of the detector.

References Cited in the file of this patent

Schultz: "Control of Nuclear Reactors and Power Plants," McGraw-Hill Book Co., N.Y. (1955), pages 70 and 89–190.

Schultz: pages 110 and 188.